US010472989B2

(12) United States Patent
Stapleton

(10) Patent No.: US 10,472,989 B2
(45) Date of Patent: Nov. 12, 2019

(54) CMC HANGER SLEEVE FOR CMC SHROUD

(71) Applicant: General Electric Company, Schenectady, NY (US)

(72) Inventor: David Scott Stapleton, Boston, MA (US)

(73) Assignee: General Electric Company, Schenectady, NY (US)

( * ) Notice: Subject to any disclaimer, the term of this patent is extended or adjusted under 35 U.S.C. 154(b) by 352 days.

(21) Appl. No.: 15/111,038

(22) PCT Filed: Dec. 18, 2014

(86) PCT No.: PCT/US2014/071058
§ 371 (c)(1),
(2) Date: Jul. 12, 2016

(87) PCT Pub. No.: WO2015/108658
PCT Pub. Date: Jul. 23, 2015

(65) Prior Publication Data
US 2016/0333741 A1 Nov. 17, 2016

Related U.S. Application Data

(60) Provisional application No. 61/928,757, filed on Jan. 17, 2014.

(51) Int. Cl.
*F01D 25/14* (2006.01)
*F01D 25/24* (2006.01)
(52) U.S. Cl.
CPC ........... *F01D 25/246* (2013.01); *F01D 25/14* (2013.01); *F05D 2300/6033* (2013.01); *Y02T 50/672* (2013.01); *Y02T 50/675* (2013.01)

(58) Field of Classification Search
CPC ..... F01D 25/14; F01D 25/246; F01D 11/0001
See application file for complete search history.

(56) References Cited

U.S. PATENT DOCUMENTS 5,584,651 A * 12/1996 Pietraszkiewicz ...... F01D 11/08
415/115
6,113,349 A   9/2000 Bagepalli et al.
7,771,160 B2  8/2010 Shi et al.
(Continued)

FOREIGN PATENT DOCUMENTS

CA    2936208 C    10/2018
CN    1312426 A    9/2001
(Continued)

OTHER PUBLICATIONS

Unofficial English Translation of Chinese Office Action issued in connection with corresponding CN Application No. 201480073307.2 dated Dec. 23, 2016.
(Continued)

*Primary Examiner* — Woody A Lee, Jr.
(74) *Attorney, Agent, or Firm* — Dority & Manning, P.A.

(57) ABSTRACT

According to some embodiments, a ceramic matrix composite (CMC) hanger sleeve is provided for retaining a ceramic matrix composite shroud panel. The sleeve may be connected to an upper hanger by a retainer or a casing. The hanger sleeve includes a radially inward opening with a flowpath panel disposed therein. When the CMC flowpath panel is worn due to time, rubs or both, the panel may be replaced without need to replace the entire assembly.

20 Claims, 5 Drawing Sheets

(56) References Cited

U.S. PATENT DOCUMENTS

| | | | |
|---|---|---|---|
| 2003/0133790 A1* | 7/2003 | Darkins, Jr. | F01D 9/04 |
| | | | 415/139 |
| 2003/0143069 A1 | 7/2003 | Kitazawa et al. | |
| 2005/0022527 A1 | 2/2005 | Nagane et al. | |
| 2008/0279679 A1* | 11/2008 | Morrison | F01D 9/042 |
| | | | 415/191 |
| 2009/0208322 A1 | 8/2009 | McCaffrey | |
| 2012/0076650 A1 | 3/2012 | Akiyama et al. | |
| 2012/0082540 A1* | 4/2012 | Dziech | F01D 11/005 |
| | | | 415/173.1 |
| 2012/0171027 A1* | 7/2012 | Albers | F01D 11/005 |
| | | | 415/208.1 |
| 2013/0156550 A1 | 6/2013 | Franks et al. | |
| 2013/0156556 A1* | 6/2013 | Franks | F01D 25/246 |
| | | | 415/182.1 |
| 2016/0169038 A1* | 6/2016 | Weaver | F01D 11/24 |
| | | | 415/116 |
| 2016/0333715 A1* | 11/2016 | McCaffrey | F01D 25/246 |
| 2016/0333741 A1 | 11/2016 | Stapleton | |
| 2017/0044920 A1* | 2/2017 | Vetters | F01D 25/246 |
| 2017/0198607 A1* | 7/2017 | Shapiro | F01D 25/246 |
| 2017/0204737 A1* | 7/2017 | Varney | F01D 11/24 |

FOREIGN PATENT DOCUMENTS

| | | |
|---|---|---|
| CN | 1573018 A | 2/2005 |
| CN | 103291387 A | 9/2013 |
| CN | 105899764 A | 8/2016 |
| EP | 0709550 A1 | 5/1996 |
| EP | 2631434 A2 | 8/2013 |
| EP | 3094828 A1 | 11/2016 |
| EP | 3094828 B1 | 2/2019 |
| JP | 5180007 B2 | 8/2017 |
| WO | 2015/108658 A1 | 7/2015 |

OTHER PUBLICATIONS

PCT Search Report and Written Opinion issued in connection with corresponding PCT Application No. PCT/US2014/071058 dated Mar. 26, 2015.

Decision to Grant Issued in Connection with Corresponding JP Application No. 2016-546005 dated Jun. 20, 2017.

Fourth Office Action and Search issued in connection with corresponding CN Application No. 201480073307.2 dated Sep. 30, 2018.

Second Office Action and Search issued in connection with corresponding CN Application No. 201480073307.2 dated Aug. 25, 2017.

Third Office Action and Search Issued in Connection with Corresponding CN Application No. 201480073307.2 dated Feb. 24, 2018.

First Office Action and Search Issued in Connection with Corresponding CA Application No. 2936208 dated Jun. 14, 2017.

India Patent Application Serial No. IN201647022495 filed on Dec. 18, 2014.

* cited by examiner

CMC HANGER SLEEVE FOR CMC SHROUD

CROSS-REFERENCE TO RELATED APPLICATIONS

This application is a national stage application under 35 U.S.C. § 371(c) of prior filed, co-pending PCT application serial number PCT/US14/071058, filed on Dec. 18, 2014 which claims priority to U.S. Provisional Patent Application Ser. No. 61/928,757, titled "CMC Hanger Sleeve for CMC Shroud" and having filing date Jan. 17, 2014. The above-listed applications are incorporated by reference herein.

FIELD OF INVENTION

The disclosed embodiments generally pertain to shrouds for a gas turbine engine. More particularly, but not by way of limitation, present embodiments relate to ceramic matrix composite hanger sleeves for ceramic matrix composite shrouds utilized in gas turbine engines.

BACKGROUND

A typical gas turbine engine generally possesses a forward end and an aft end with its several core or propulsion components positioned axially therebetween. An air inlet or intake is located at a forward end of the engine. Moving toward the aft end, in order, the intake is followed by a compressor, a combustion chamber, and a turbine. It will be readily apparent from those skilled in the art that additional components may also be included in the gas turbine engine, such as, for example, low-pressure and high-pressure compressors, and low-pressure and high-pressure turbines. This, however, is not an exhaustive list. A gas turbine engine also typically has an internal shaft axially disposed along a center longitudinal axis of the engine. The internal shaft is connected to both the turbine and the air compressor, such that the turbine provides a rotational input to the air compressor to drive the compressor blades.

In operation, air is pressurized in a compressor and mixed with fuel in a combustor for generating hot combustion gases which flow downstream through turbine stages. These turbine stages extract energy from the combustion gases. A high pressure turbine first receives the hot combustion gases from the combustor and includes a stator nozzle assembly directing the combustion gases downstream through a row of high pressure turbine rotor blades extending radially outwardly from a supporting rotor disk. In a two stage turbine, a second stage stator nozzle assembly is positioned downstream of the first stage blades followed in turn by a row of second stage rotor blades extending radially outwardly from a second supporting rotor disk. The turbine converts the combustion gas energy to mechanical energy.

Each of the high pressure and low pressure turbines may include one or more stages of rotor blades which extend radially outward from rotor discs. A shroud assembly circumscribes the turbine rotor and defines an outer boundary for combustion gases flowing through the turbine. The turbine shroud may be a single unitary structure or may be formed of a plurality of segments. Some known shroud assemblies include a shroud hanger that is coupled to an outer casing of the engine to provide support to a plurality of shrouds positioned adjacent to, and radially outward of, the tips of the turbine blades.

The shroud must be capable of meeting the design life requirements for use in the turbine engine operating temperature and pressure environment. To enable current materials to operate effectively in such strenuous temperature and pressure conditions, it has been practiced to utilize composite and, in particular, ceramic matrix composite (CMC) materials for use in the shroud segments because they have higher temperature capability than metallic type parts. However, such ceramic matrix composite (CMC) have mechanical properties that must be considered during the design and application of the CMC use as a shroud segment or component. CMC materials have relatively low tensile ductility or low strain to failure when compared to metallic materials. Also, CMC materials have a coefficient of thermal expansion which differs significantly from metal alloys used as restraining supports or hangers for shrouds of CMC type materials. Therefore, if a CMC shroud segment is restrained and cooled on one surface during operation, stress concentrations can develop leading to failure of the segment.

Another goal with existing shroud structures is to improve stress levels and gradients with the flowpath portion of the shroud, and therefore improve hardware durability. Further, when adjacent blades expand and contract due to thermal conditions, the blades can rub the shroud needing replacement. Over time, the rubs may result in blades needing to be replaced or the shroud. It may be beneficial to have portions of the shroud be replaced in the flowpath area, rather than the entire shroud structure.

As may be seen by the foregoing, it may be beneficial to improve aspects of function and durability of gas turbine engine components. Moreover, it may be beneficial to improve the reliability of a CMC shroud, part quality, manufacturability and allow for replacement solely of the flowpath portion of the shroud assembly.

The information included in this Background section of the specification, including any references cited herein and any description or discussion thereof, is included for technical reference purposes only and is not to be regarded subject matter by which the scope of the instant embodiments are to be bound.

BRIEF DESCRIPTION

According to some embodiments, a CMC hanger sleeve is provided for retaining a ceramic matrix composite shroud panel. The hanger is connected to an upper hanger by a retainer. The hanger sleeve includes a radially inward opening with a flowpath panel disposed therein. When this flowpath panel is worn due to time, rubs or both, the flowpath panel may be replaced without need to replace the entire assembly.

According to some embodiments, a ceramic matrix composite hanger assembly includes a CMC hanger sleeve having a first CMC hanger sleeve leg and a second CMC hanger sleeve leg, the first and second CMC hanger sleeve legs may be spaced apart at a radial inward end. A CMC flowpath panel is disposed between the first and second CMC hanger sleeve legs at the radial inward end. A spacing may be between the radial outer ends of the first and second CMC hanger sleeve legs and, a cooling air flowpath passing through the CMC hanger sleeve and cooling the flowpath panel.

All of the above outlined features are to be understood as exemplary only and many more features and objectives of the CMC hanger sleeve for the CMC shroud may be gleaned from the disclosure herein. This Brief Description is provided to introduce a selection of concepts in a simplified form that are further described below in the Detailed Description. This Brief Description is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims. Therefore, no limiting interpretation of this summary is to be understood without further reading of the entire specification, claims, and drawings included herewith.

BRIEF DESCRIPTION OF THE ILLUSTRATIONS

The above-mentioned and other features and advantages of these exemplary embodiments, and the manner of attaining them, will become more apparent and the CMC hanger sleeve for CMC shroud will be better understood by reference to the following description of embodiments taken in conjunction with the accompanying drawings, wherein.

DETAILED DESCRIPTION

Figure 1:
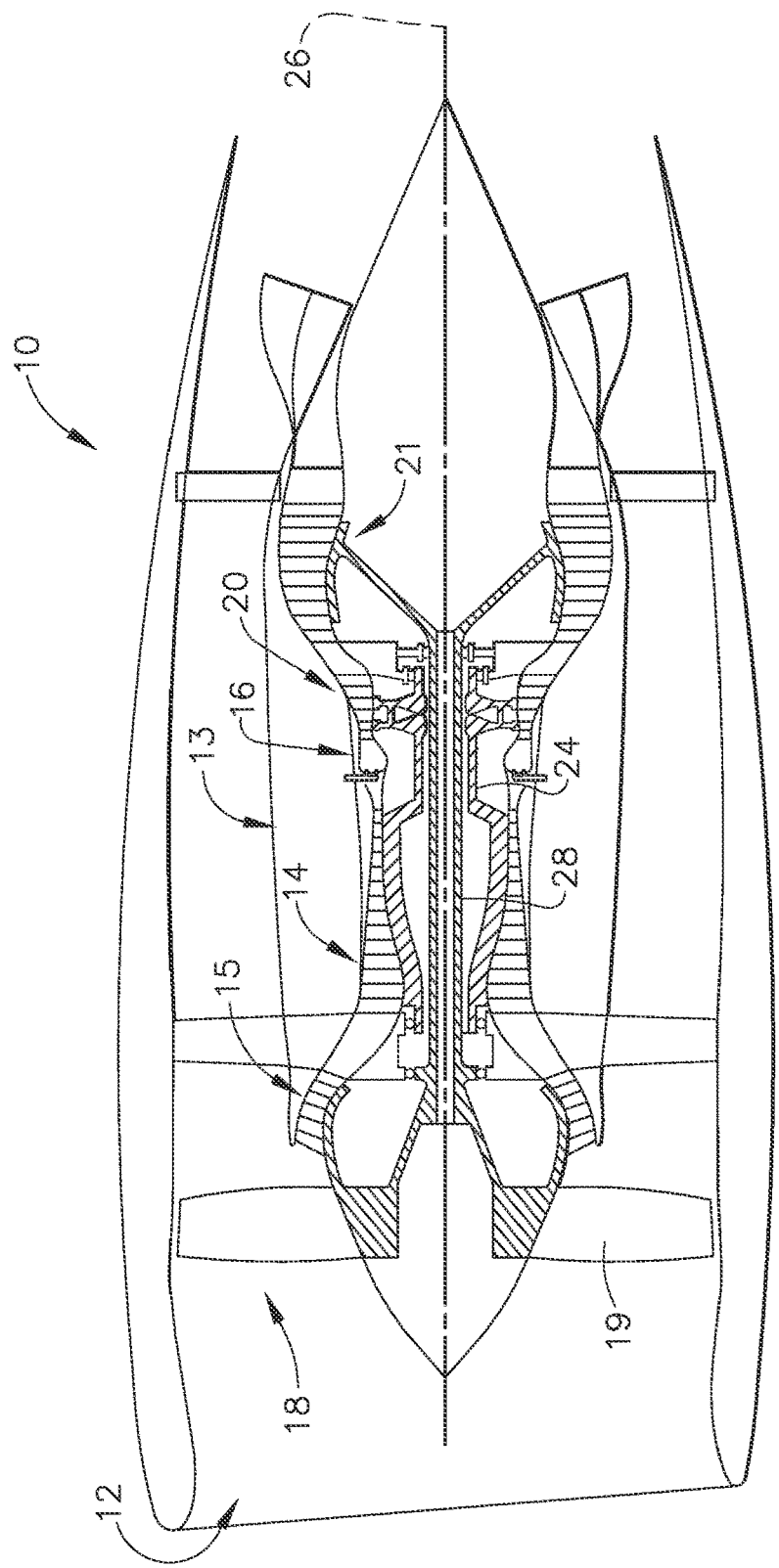
FIG. 1 is a side section view of an exemplary gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Referring to FIGS. 1-7 various embodiments of a Ceramic Matrix Composite ("CMC") hanger sleeve for a CMC shroud are depicted. The shroud hanger sleeve is an alternative architecture wherein the flowpath portion of the shroud is separated into multiple portions along the axial direction while a majority of the flowpath surface is formed from a panel, which may aid in part, quality and manufacturability. All of these features improve any or all of manufacture, operation or performance.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component. As used herein, the terms "radial" or "radially" refer to a dimension extending between a center longitudinal axis of the engine and an outer engine circumference.

Referring initially to FIG. 1, a schematic side section view of a gas turbine engine 10 is shown. The function of the gas turbine engine 10 is to extract energy from high pressure and temperature combustion gases and convert the energy into mechanical energy for work. The gas turbine engine 10 has an inlet end 12 wherein air enters the core or propulsor 13 which is defined generally by a high pressure compressor 14, a combustor 16 and a multi-stage high pressure turbine 20. Collectively, the propulsor 13 provides thrust or power during operation. The gas turbine engine 10 may be used for aviation, power generation, industrial, marine or the like.

In operation, air enters through the air inlet end 12 of the gas turbine engine 10 and moves through at least one stage of compression where the air pressure is increased and directed to the combustor 16. The compressed air is mixed with fuel and burned in the combustor 16 providing the hot combustion gas which exits the combustor 16 toward the high pressure turbine 20. At the high pressure turbine 20, energy is extracted from the hot combustion gas causing rotation of turbine blades which in turn cause rotation of the shaft 24. The shaft 24 passes toward the front of the gas turbine engine 10 to continue rotation of the one or more compressor stages 14, 15, a fan 18 having inlet fan blades 19, depending on the turbine design. The fan 18 is connected by the shaft 28 to a low pressure turbine 21 and creates thrust for the gas turbine engine 10. The low pressure turbine 21 may also be utilized to extract further energy and power additional low pressure compressor stages 15. The low pressurized air from the low pressure compressor 15 may be used to aid in cooling components of the engine as well.

Figure 2:
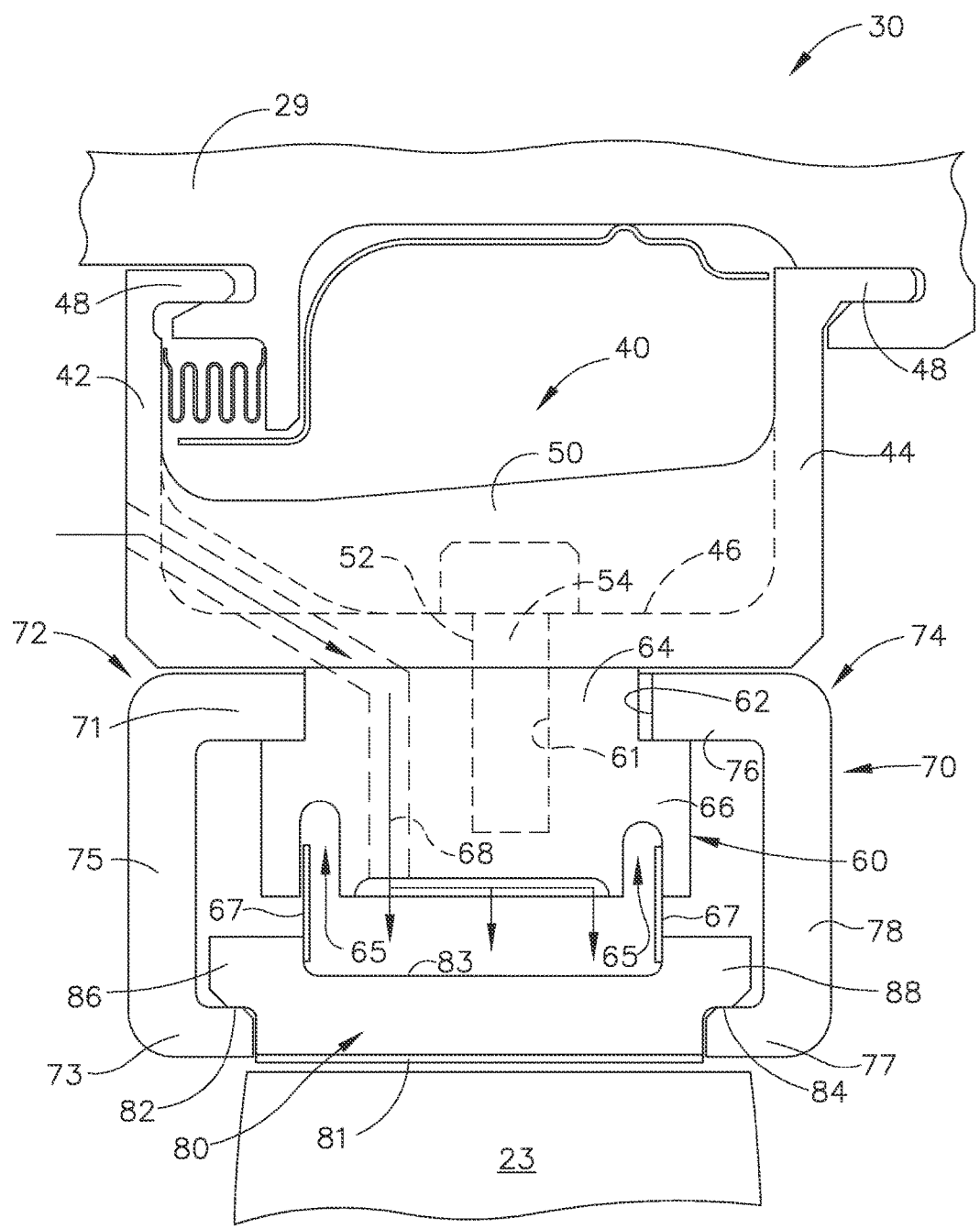
FIG. 2 is a side section view of an assembled exemplary turbine assembly including a CMC hanger sleeve and CMC shroud or flowpath panel.

Referring now to FIG. 2, a side section view of exemplary shroud support assembly 30 is depicted. An exemplary turbine is shown, however the instant embodiments are not limited to turbine use. The high pressure turbine 20 (FIG. 1) includes a row of circumferentially spaced stationary vanes (not shown) and a plurality of circumferentially spaced turbine blades 23 downstream axially of the vanes. The turbine blades 23 are foil-shaped and mounted to a turbine rotor disk (not shown). Each of the turbine blades 23 extends radially toward the shroud assembly 30. The shroud assembly 30 extends circumferentially about the engine axis 26 (FIG. 1) and may be comprised of a plurality of flowpath panels 80 in the circumferential direction. The shroud assembly 30 is tightly configured relative to the turbine blades 23 to improve turbine efficiency so that the shroud assembly 30 defines an outer radial flowpath boundary for the hot combustion gas flowing through the high pressure turbine 20. Turbine efficiency is based upon the ability of the airfoil surfaces to extract energy from the differential pressure in the combustion gases acting over the pressure and suction sides of the airfoil from root to tip and between the leading and trailing edges.

The shroud assembly 30 includes an upper shroud hanger 40 which may include various shapes. An engine casing 29 extends circumferentially about the engine axis 26 (FIG. 1). Upper shroud hanger 40 extends from the radially inward side of the engine casing 29 and retains hanger sleeve 70 in circular configuration about the engine axis 26 (FIG. 1). The hanger sleeve or shroud sleeve 70 retains a flowpath panel 80 in position which defines the flow boundary within portions of the gas turbine engine 10, for non-limiting example, the compressor 14 or high pressure turbine 20.

As depicted, the upper shroud hanger 40 is generally U-shaped in section including a first radially extending leg 42, a second radially extending leg 44 and a third axially extending leg 46 extending between the first and second legs 42, 44. The first and second legs 42, 44 extend in a circumferential direction about the engine axis 26. The upper shroud hanger 40 extends in the circumferential direction. The upper shroud hanger 40 may be formed of metal or alternatively may be formed of ceramic matrix composite material. At radially outward ends of the first and second legs, 42, 44 are hooks 48 which engage structures in the engine case 29. The hooks 48 extend in the axial direction to mate with engaging structure of the engine case 29. For example, the hooks 48 are generally male while the turbine case includes female receiving structures. Further, while hooks 48 are shown, other structures may be utilized and for example, a male part may be located on the engine case 29 and a female part may be located on the upper shroud hanger 40. According to alternate embodiments, it is within the scope of the present disclosure that the hanger sleeve 70 may extend to the engine casing 29 and be connected thereto, wherein the upper shroud hanger 40 may be eliminated.

Multiple support webs or gussets 50 may extend between the first leg 42 and the second leg 44. The gussets 50 may be spaced apart in the circumferential direction of the upper hanger. The support web or gusset 50 may extend between the first leg 42 and the second leg 44 and may extend axially or may extend at an angle to the central engine axis 26 as depicted. For example, the instant embodiment provides a gusset 50 that is tapered from a lower radial height at the first leg 42 to a higher radial height at the second leg 44. The gusset 50 may alternatively be tapered in the opposite direction or may extend horizontally.

The axial leg 46 includes one or more spaced-apart bolt apertures 52 which receive a fastener 54. The fastener 54 extends through the upper shroud hanger 40 into a retainer or baffle 60. The retainer 60 captures the hanger sleeve 70 and pulls the hanger sleeve 70 against the upper shroud hanger 40. The fasteners 54, for example bolts, may be parallel to one another to reduce bolt bending. This increases bolt durability and results in an improved joint. According to alternative embodiments however, the fasteners 54 may be disposed at an angle relative to each other, for example all extending in the radial direction, for ease of assembly.

The hanger sleeve 70 extends in a circumferential direction and includes a CMC shroud sleeve forward leg 72 and a CMC hanger sleeve aft leg 74. The forward leg 72 is formed by a C-shape including an upper portion 71, a lower portion 73 and radially extending portion 75 between the upper and lower portions 71, 73. Similarly, the aft leg 74 includes an upper portion 76, a lower portion 77 and a radially extending portion 78 and defines a reverse C-shape in section. The hanger sleeve 70, upper shroud hanger 40 and shroud flowpath panel 80 include circumferential end faces which are commonly referred to as "slash faces." The slash faces may lie in plane parallel to the center line axis 26 of the gas turbine engine 10, referred to as a "radial plane", or they may be slightly offset from the radial plane, or otherwise oriented so that they are at an acute angle to such radial plane.

Figure 3:
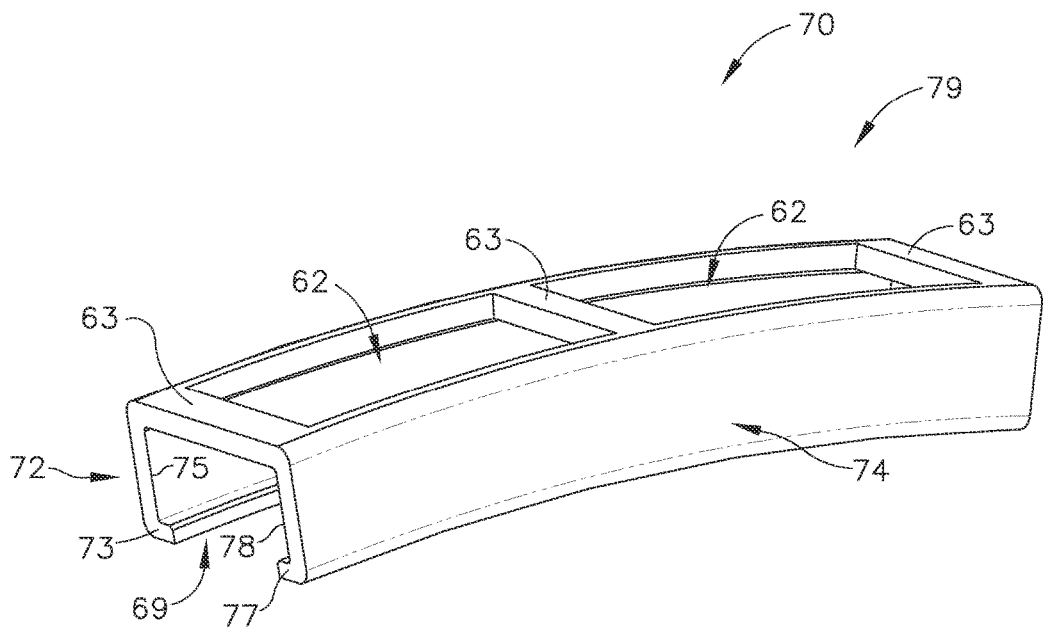
FIG. 3 is an isometric view of a first exemplary shroud hanger.

The hanger sleeve 70 is shown having two leg portions 72, 74 although this sleeve segment 70 is a one-piece segment as shown in FIG. 3. This is due to the location of the section cut in the depicted view. However, one skilled in the art should realize that the hanger sleeve 70 may be formed of a two or more piece structure as described and shown further herein.

When circumferential segments of the hanger sleeve 70, flowpath panel 80 segments and upper shroud hanger 40 segments are assembled, complete rings are formed. End gaps may be present between the slash faces of the adjacent segments. One or more seals may be provided at these slash faces. These seals are generally known as "spline" seals formed of thin strips of metal or other suitable materials which are inserted in slots in the end faces to span the gaps between adjacent segments. Additionally, when assembled, the circumferential ends of the upper shroud hanger 40, the hanger sleeve 70 and the flowpath panel 80 may be aligned or offset or some combination thereof.

The forward leg 72 and the aft leg 74 are spaced apart at a radial outer end by a window 62. The forward leg 72 and the aft leg 74 are alternatively joined in a different circumferential location. The hanger sleeve 70 may include one or more windows 62 depending on the circumferential length of the hanger sleeve 70. The retainer 60 extends through the window 62 and is sized to be of a larger dimension in at least one corresponding dimension to the window 62 so that when the fastener 54 is tightened, the retainer 60 pulls the hanger sleeve 70 radially to the upper shroud hanger 40.

The baffle 60 may be, according to some embodiments, an inverted T-shape which engages the upper shroud hanger 40 at one end. The T-shape has a radially extending leg 64 and a transversely extending leg 66. A cooling air flowpath 68 may extend through the baffle 60 to provide cooling air to the flowpath panel 80 of the CMC shroud. The cooling air flowpath 68 may receive air from the upper shroud hanger 40. These holes provide shroud cooling air from a known source, for example the compressor, through the retainer baffle 60 and to the flowpath panel 80.

The baffle 60 receives the fastener 54 in aperture 61. The lower surface of the baffle 60 may include one or more cooling apertures, for example arranged in an array, to provide backside impingement cooling to the flowpath panel 80.

The transverse leg 66 may include reliefs, slots, or other features 65 adjacent the radially inward end. According to instant embodiment, a seal 67, such as a leaf seal, is disposed in the feature 65. The leaf seal 67 forces cooling air from the retainer 60 to cool the upper surface 83 of the flowpath panel 80.

Extending between the lower portions 73, 77 is a flowpath panel 80. A lower surface 81 of the flowpath panel 80 is disposed adjacent to the turbine blade 23 while an upper surface 83 is facing the retainer 60 and receives cooling air passing from the retainer 60. The flowpath panel 80 includes a first shoulder 82 near a forward axial end and a second shoulder 84 near a second rearward axial end. The first shoulder 82 engages the upper surface of the first or forward axial portion 73. The second shoulder 84 engages the upper surface of the second or rearward axial portion 77.

The first shoulder 82 is depicted as horizontal in the section view. Similarly, the second shoulder 84 is also depicted as horizontal. The corresponding contact surfaces of the lower portions 73, 77 are also horizontal in the depicted embodiment. The horizontal surfaces of the shoulders 82, 84 and the lower portions 73, 77 define pressure flats which engage one another. This allows for engagement of the flowpath panel 80 and support between the lower portions 73, 77. The pressure flats may alternatively be angled or tapered surfaces rather than horizontal.

Extending from the shoulders 82, 84 are arms 86, 88. The arms 86, 88 may extend radially or may extend at an angle within the bounds of the forward and aft legs 72, 74. The seals 67 extend from the feature areas 65 to the arms 86, 88. The arms 86, 88 are spaced apart wider than the spacing between ends of lower portions 73, 77.

The hanger sleeve 70 and flowpath panel 80 may be formed of various low ductility and low coefficient of thermal expansion materials including, but not limited to, ceramic matrix composite (CMC). Generally, CMC materials include a ceramic fiber, for example a silicon carbide (SiC), forms of which are coated with a compliant material such as boron nitride (BN). The fibers are coated in a ceramic type matrix, one form of which is silicon carbide (SiC). Typically, the shroud hanger 40 can also be constructed of other low-ductility, high-temperature-capable materials. CMC materials generally have room temperature tensile ductility of less than or equal to about 1% which is used herein to define a low tensile ductility material. Generally, CMC materials have a room temperature tensile ductility in the range of about 0.4% to about 0.7%.

CMC materials have a characteristic wherein the materials tensile strength in the direction parallel to the length of the fibers (the "fiber direction") is stronger than the tensile strength in the direction perpendicular. This perpendicular direction may include matrix, interlaminar, secondary or tertiary fiber directions. Various physical properties may also differ between the fiber and the matrix directions.

At least the lower exterior surfaces of the lower portions 73, 77 and the lower surface 81 of the flowpath panel 80 may also incorporate a layer of environmental barrier coating, which may be an abradable material, and/or a rub-tolerant material of a known type suitable for use with CMC materials. This layer is sometimes referred to as a "rub coat". As used herein, the term "abradable" implies that the rub coat is capable of being abraded, ground, or eroded away during contact with the tips of the turbine blades 23 as they turn inside the flowpath panel 80 extending at high speed, with little or no resulting damage to the turbine blade tips. This abradable property may be a result of the material composition of the rub coat, by its physical configuration or by some combination thereof. The rub coat may include a ceramic layer such as yttria stabilized zirconia or barium strontium aluminosilicate.

Referring now to FIG. 3, is an isometric view of the shroud hanger sleeve 70. The hanger sleeve 70 extends circumferentially and is shown as a segment 79. The segment 79 may be of a length to extend completely circumferentially as a single structure. Alternatively, as depicted, the segment 79 may be shorter wherein the multiple segments are utilized to surround the high pressure turbine 20.

Figure 4:
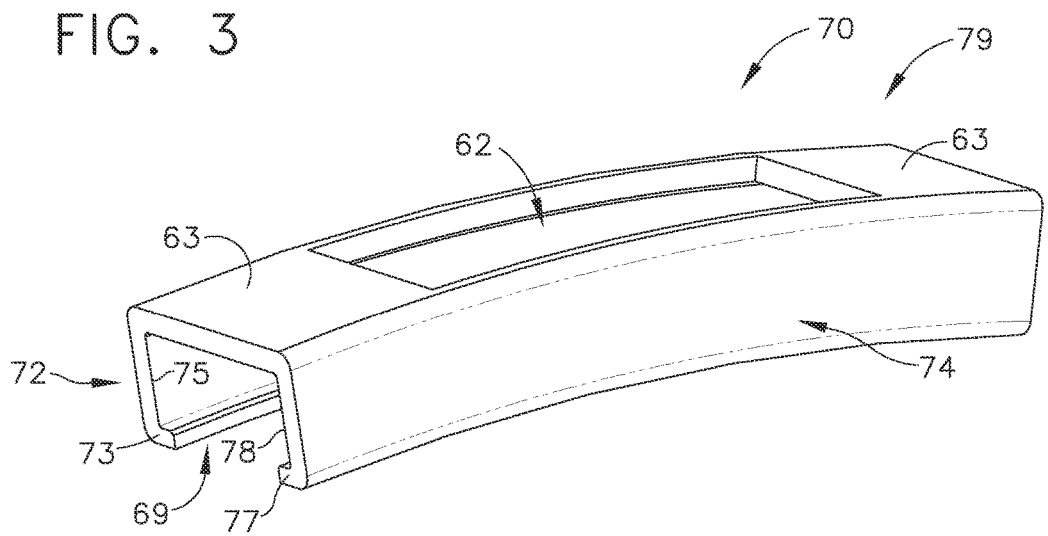
FIG. 4 is an isometric view of a second exemplary shroud hanger.
Figure 5:
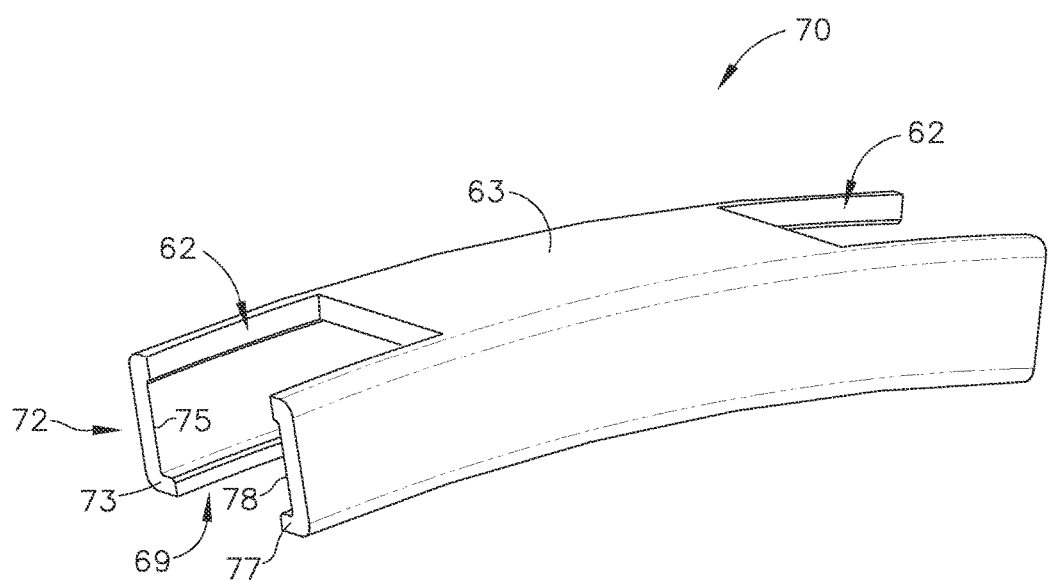
FIG. 5 is an isometric view of a further alternate exemplary shroud hanger.

Also, as shown, the hanger sleeve 70 includes the windows 62 in the upper surface 63. The windows 62 may be formed of various sizes and are defined by structures defining the windows 62. The upper surface 63 of the structures may be of various widths in the circumferential direction and/or may be spaced apart at different distances in the circumferential direction. The upper surface 63 width or spacing may be dependent upon loading, retainer 60 size, ducting of cooling air from the upper shroud hanger 40 and other variables. For example, the depicted segment 79 may have a single window 62 which may be centered or may have a centered arrangement, as shown in FIG. 4 or may be off-center. Alternatively, the segment 79 may have two or more windows 62. Further, the one or more windows 62 may extend to the circumferential end of the sleeve segment 79 so as to mate with an adjacent window of an adjacent segment and define a larger window, as depicted in FIG. 5.

Figure 6:
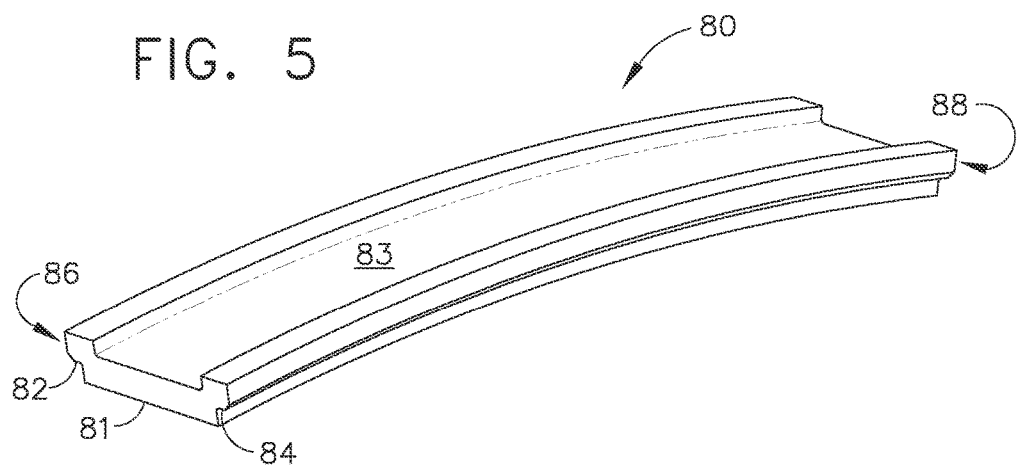
FIG. 6 is an isometric view of a CMC flowpath panel for use with the exemplary shroud hangers; and, FIG. 7 is an isometric view of a second exemplary shroud assembly.

Referring now to FIG. 6, an isometric view of the flowpath panel 80 removed from the hanger sleeve 70 is depicted. The flow panel lower surface 81 and the upper surface 83 may be curved as shown or alternatively, may be linear so that a plurality of flowpath panels 80 can approximate the circumferential shape of the high pressure turbine 20.

The flowpath panel 80 also includes shoulders 82, 84 which define the flat pressure surfaces. The shoulders 82, 84 and arms 86, 88 retain the flowpath panel 80 within the opening 69 (FIG. 5) of the hanger sleeve 70 between lower portions 73, 77. While the panel utilizes a right angle architecture between the shoulders 82, 84 and a sidewall of the panel extending from the lower surface 81, other architectures may be utilized. For example, the flowpath panel 80 may include an angled pressure flat so that the angle between the shoulder surface and the sidewall is not 90 degrees. The sidewalls extending from the lower surface 81 may also be angled, rather than extending from the lower surface at 90 degrees. Various alternative shapes may be used to provide for retaining engagement between the flowpath panel 80 and the hanger sleeve 70.

The upper panel surface 83 also receives cooling air from the retainer 60, above. The impingement cooling air aids to maintain the temperature of the flowpath panel 80 at a suitable temperature or within a suitable operating range.

The flowpath panel 80 is dimensioned so that when the shoulders 82, 84 are seated, the lower surface 81 is flush with the lower surface of the lower portions 73, 77.

As shown herein, the joints between walls are generally radiused which may improve manufacture of the part. However, other arrangements such as sharp angle corners may be used.

Figure 7:
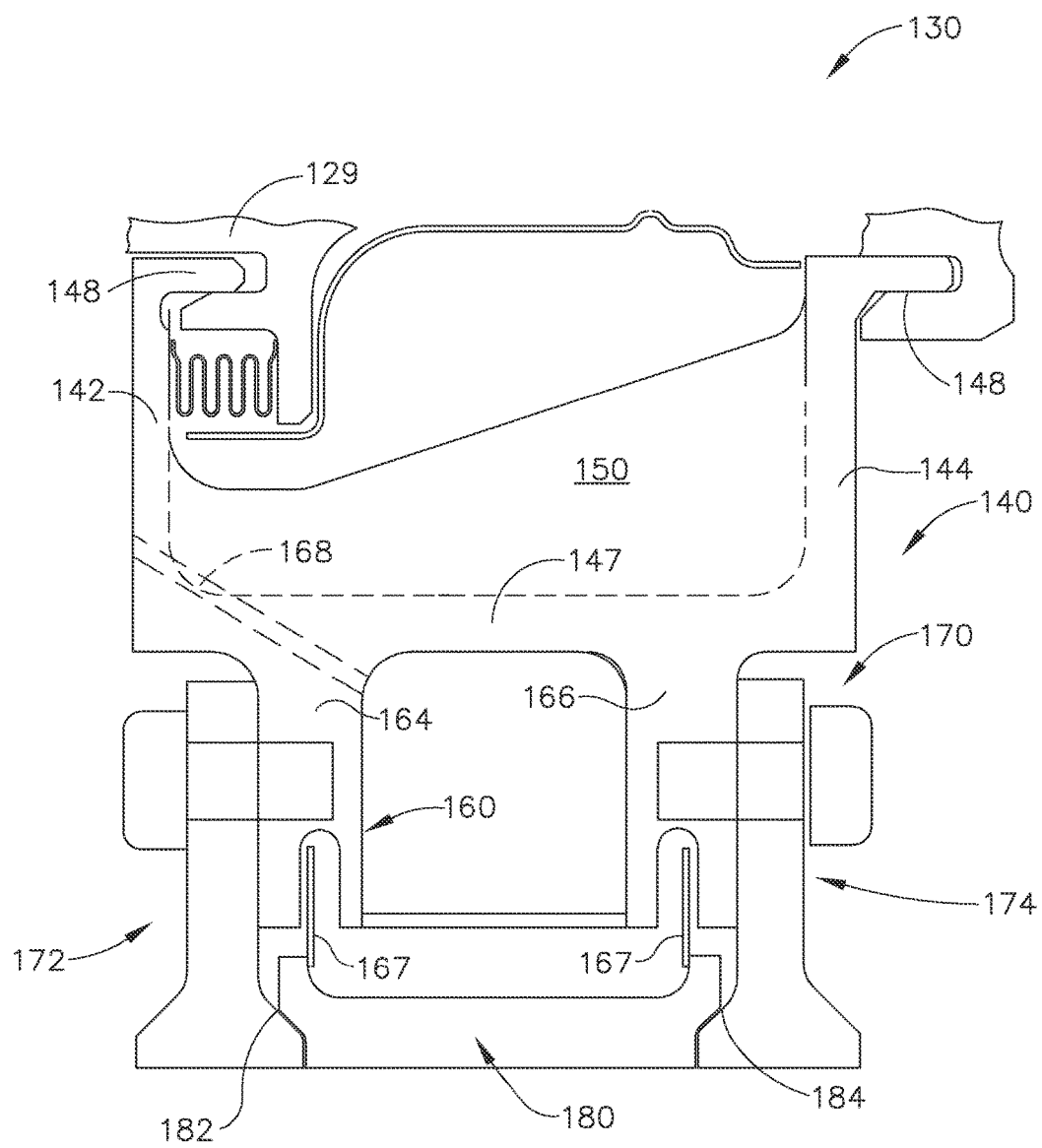

Referring now to FIG. 7, a second embodiment of the shroud assembly 130 is depicted. At an upper end of the shroud assembly 130 is an upper shroud hanger 140 having a first leg 142 and a second leg 144 similar to the previously described embodiment. The upper ends of the first and second legs 142, 144 include hooks 148 for connection with an engine casing 129. Extending between the first leg 142 and the second leg 144 is a shroud hanger base 147. In combination with the first and second legs 142, 144, the hanger base 147 forms a U-shape for the upper shroud hanger 140. Extending between the first and second legs 142, 144 is a support web or gusset 150. Passing through the upper shroud hanger 140 is a cooling flowpath 168.

Depending from the hanger base 147 is an alternative retainer 160 which is integrally formed with the upper shroud hanger 140. Depending from the shroud hanger 140 is a first retainer leg 164 and a second retainer leg 166. As with the previously described structures, the legs 164, 166 extend circumferentially with the segment structure defining a portion or all of the upper shroud hanger 140.

Connected to the retaining legs 164, 166 is an alternative embodiment of the CMC hanger sleeve 170. The hanger sleeve 170 is defined by separated first and second CMC hanger sleeve legs 172, 174. The legs 172, 174 extend in a radial direction and in a circumferential direction and are fastened to the retainer legs 164, 166. The first CMC hanger sleeve leg 172 and second CMC hanger sleeve leg 174 include lower ends which engage the flowpath panel 180. The flowpath panel 180 has shoulders. The shoulders 182, 184 are formed and have surfaces which engage corresponding surfaces of legs 172, 174.

A leaf seal 167 may extend between the U-shaped flowpath panel 180 and the upper shroud hanger 140. The cooling flowpath 168 allows a path through the open shroud hanger 140 and between the retaining legs 164, 166 to provide impingement cooling to the flowpath panel 180.

The foregoing description of structures and methods has been presented for purposes of illustration. It is not intended to be exhaustive or to limit the structures and methods to the precise forms and/or steps disclosed, and obviously many modifications and variations are possible in light of the above teaching. Features described herein may be combined in any combination. Steps of a method described herein may be performed in any sequence that is physically possible. It is understood that while certain forms of composite structures have been illustrated and described, it is not limited thereto and instead will only be limited by the claims, appended hereto.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A ceramic matrix composite (CMC) hanger assembly, comprising:
   a CMC hanger sleeve having a first CMC hanger sleeve leg and a second CMC hanger sleeve leg, wherein the first and second CMC hanger sleeve legs are spaced apart at a radial inward end;
   a CMC flowpath panel disposed between the first and second CMC hanger sleeve legs at the radial inward end;
   a spacing between a radial outer end of the first and second CMC hanger sleeve legs; and,
   a cooling air flowpath passing through the CMC hanger sleeve and cooling the CMC flowpath panel,
   wherein the first leg and the second leg have a surface for engaging a shoulder of the flowpath panel.

2. The ceramic matrix composite hanger assembly of claim 1, further comprising an upper shroud hanger connectable to a turbine case.

3. The ceramic matrix composite hanger assembly of claim 2, further comprising a retainer disposed adjacent to the hanger sleeve, wherein the retainer has a dimension in one direction which is greater than a window of the hanger sleeve in the one direction.

4. The ceramic matrix composite hanger assembly of claim 3, wherein the first CMC hanger sleeve leg and the second CMC hanger sleeve leg is a unitary structure.

5. The ceramic matrix composite hanger assembly of claim 4, wherein the unitary structure is an inverted U-shape in section.

6. The ceramic matrix composite hanger assembly of claim 3, further comprising a fastener passing through the upper shroud hanger to the retainer.

7. The ceramic matrix composite hanger assembly of claim 2, wherein the upper shroud hanger has a first leg and a second leg.

8. The ceramic matrix composite hanger assembly of claim 7, wherein the first hanger sleeve leg is fastened to the upper shroud hanger.

9. The ceramic matrix composite hanger assembly of claim 8, wherein the second hanger sleeve leg is fastened to the upper shroud hanger.

10. The ceramic matrix composite hanger assembly of claim 1, further comprising a leaf seal extending between one of an upper shroud hanger and a retainer and the CMC flowpath panel.

11. The ceramic matrix composite hanger assembly of claim 1, wherein the CMC flowpath panel is U-shaped.

12. The ceramic matrix composite hanger assembly of claim 11, wherein the shoulder is horizontal.

13. The ceramic matrix composite hanger assembly of claim 11, wherein the shoulder is angled.

14. The ceramic matrix composite hanger assembly of claim 1, further comprising an upper shroud hanger connectable to a turbine case, wherein the cooling air flowpath extends through the upper shroud hanger.

15. The ceramic matrix composite hanger assembly of claim 14, wherein the first CMC hanger sleeve leg and the second CMC hanger sleeve leg is a unitary structure.

16. The ceramic matrix composite hanger assembly of claim 1, further comprising a retainer disposed adjacent to the spacing, wherein the retainer has a dimension in one direction which is greater than the spacing in the one direction.

17. A ceramic matrix composite (CMC) hanger assembly, comprising:
- a CMC hanger sleeve having a first CMC hanger sleeve leg and a second CMC hanger sleeve leg, wherein the first and second CMC hanger sleeve legs are spaced apart at a radial inward end;
- a CMC flowpath panel disposed between the first and second CMC hanger sleeve legs at the radial inward end;
- a spacing between a radial outer end of the first and second CMC hanger sleeve legs;
- a cooling air flowpath passing through the CMC hanger sleeve and cooling the CMC flowpath panel;
- an upper shroud hanger connectable to a turbine case, the cooling air flowpath extending through the upper shroud hanger; and,
- first and second retaining legs depending from the upper shroud hanger,
- wherein at least a portion of the CMC hanger sleeve is integrally formed, and
- wherein the first and second CMC hanger sleeve legs are connected to the depending retaining legs.

18. The ceramic matrix composite hanger assembly of claim 17, wherein the CMC hanger sleeve first leg and second leg are independent of one another.

19. A ceramic matrix composite (CMC) hanger assembly, comprising:
- a CMC hanger sleeve having a first CMC hanger sleeve leg and a second CMC hanger sleeve leg, wherein the first and second CMC hanger sleeve legs are spaced apart at a radial inward end;
- a CMC flowpath panel disposed between the first and second CMC hanger sleeve legs at the radial inward end;
- a spacing between a radial outer end of the first and second CMC hanger sleeve legs;
- a cooling air flowpath passing through the CMC hanger sleeve and cooling the CMC flowpath panel; and,
- a leaf seal extending between one of an upper shroud hanger and a retainer and the CMC flowpath panel.

20. The ceramic matrix composite hanger assembly of claim 19, wherein the CMC flowpath panel is U-shaped, and wherein the CMC flowpath panel has shoulders which are seated on the first and second CMC hanger sleeve legs.

* * * * *